Oct. 11, 1932.　　　E. B. BRITTIN　　　1,882,479
BRACKET
Filed Aug. 31, 1928
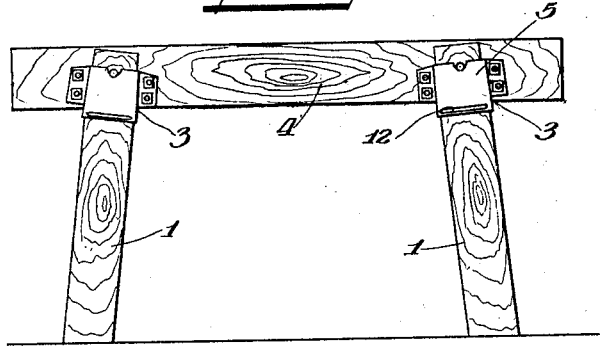
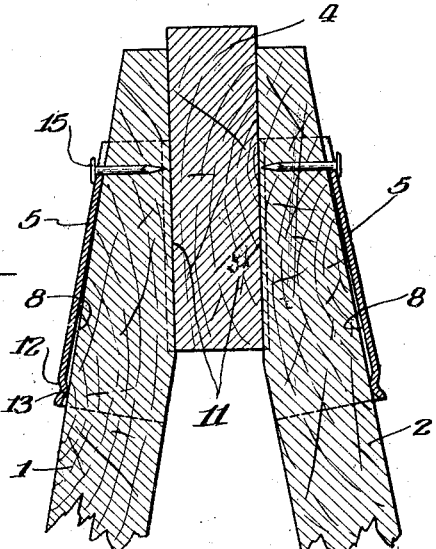
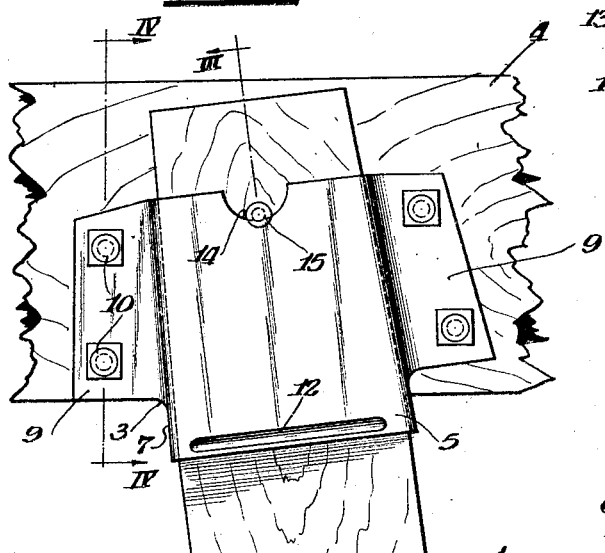
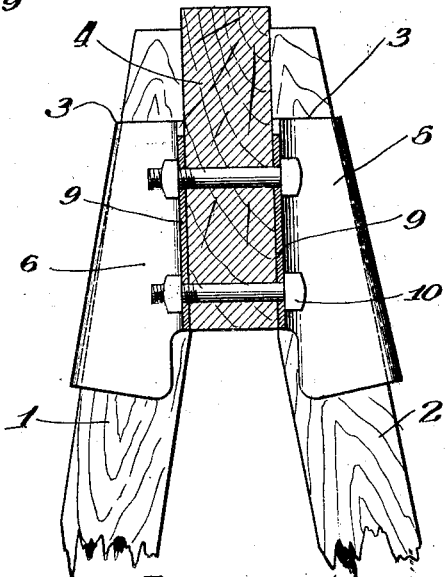
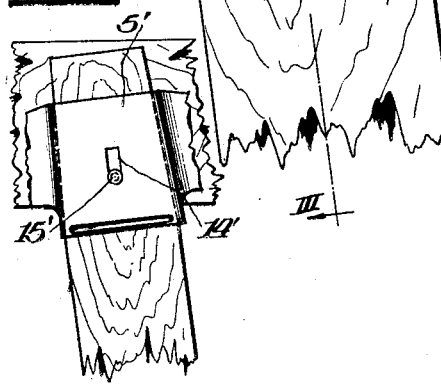
Inventor:
Edward B. Brittin.
by:

Patented Oct. 11, 1932

1,882,479

UNITED STATES PATENT OFFICE

EDWARD B. BRITTIN, OF CHICAGO, ILLINOIS

BRACKET

Application filed August 31, 1928. Serial No. 303,159.

This invention relates to improvements in brackets, and more particularly to brackets of the type commonly used for joining removable legs, supports, uprights, etc., to wooden horses, scaffolding, trucks, and equivalent devices, although the invention has many and varied uses as will be apparent to one skilled in the art.

In the past, many and varied devices have been developed for joining a leg or supporting element, for example, to a wooden horse or scaffolding, but these formerly known devices have proven objectionable, in most instances, due to the fact that they would not hold a leg or the like, sufficiently positively by merely inserting the leg in the bracket, extraneous securing means being necessary if a really positive securement was desired. Moreover, these formerly known devices, in many instances, were not mountable upon a suitable member in such a manner as to hold a leg at any desired angle to the member. Further, when securing means were used to lock a leg in one of these formerly known devices, if the leg contracted due to temperature changes or for other reasons, its engagement with the device would become loose and wobbly and the structure did not automatically compensate for this condition.

The present invention has been designed to overcome the above noted defects and objections in the provision of a bracket of the character described herein, which may be mounted at any desired angle on a suitable structure.

The invention also seeks to provide a bracket mountable on any suitable structure and shaped to provide a socket for the reception of a leg, upright, or the equivalent therein, the bracket being provided with means to automatically exert a clamping action upon the leg simultaneously with its entrance into the socket.

Another object of the present invention is to provide a bracket of the character described, adapted to accommodate additional means for connecting the bracket and element entering thereinto, in such a manner, that the element is prevented from leaving the bracket but permitted to extend further thereinto, whereby contraction of the element is automatically compensated for.

A still further object of the present invention is to provide a device of the character described herein, which is reinforced at the portion of most strain.

While some of the more salient features, characteristics, and advantages, of a device embodying the present invention have been above pointed out, others will become apparent from the following disclosures.

The invention includes these and other features and combinations of parts hereinafter described, and shown in a preferred form in the drawing, as more particularly indicated by the claims.

On the drawing:

Figure 1 is a side elevational view of a structure including devices embodying principles of the present invention.

Figure 2 is an enlarged fragmentary elevational view of a portion of the structure shown in Figure 1.

Figure 3 is a fragmentary sectional view taken substantially along line III—III of Figure 2.

Figure 4 is a fragmentary sectional view taken substantially as indicated by line IV—IV of Figure 2.

Figure 5 is a fragmentary view of a modification of my invention.

As shown in the drawing:

The structure arbitrarily chosen to illustrate an embodiment of the present invention includes, in this instance, a wooden horse comprising a pair of legs 1 on one side thereof and opposed legs 2 on the opposite side thereof, the upper portions of which are each held by a bracket 3 secured to a transverse beam 4.

The brackets 3 which embody principles of the present invention, are preferably of metal and each is shaped to provide walls 5, 6, and 7, to form an inner socket 8 which receives the upper portion of a leg. The brackets shown in the drawing are identical in construction and are interchangeable to form right and left hand brackets.

As seen more clearly in Figure 2, the bracket includes a pair of lateral wings 9 extending from opposite sides of the socket portion of the bracket, these wings being suitably apertured to accommodate any desired securing means, or as shown, bolts 10 which preferably pass entirely through the beam 4 and simultaneously support opposed brackets one on either side of the beam as shown more clearly in Figure 4.

In many instances, and especially for such a structure as shown in Figure 1, a leg 1 should not be exactly at right angles to the beam 4 but, to provide a more stable structure, should be outwardly inclined. It should be noted, therefore, that the bracket 3 is mountable on the beam 4 at any desired angle with respect to the lower edge of the beam so that the leg may be given any desired inclination.

As shown more clearly in Figures 2 and 3, the bracket walls are preferably tapered, converging upwardly, and the end portion of a leg is tapered accordingly, and also provided with a substantially straight inner face 11 which lies in abutment with the beam 4. This construction obviously provides a more stable resulting structure.

It should be noted that the lower edges of the walls 5, 6, and 7, forming the socket 8, extend outwardly beyond the edge of the beam 4 to thereby lend added support to the leg. The extended portion of the wall 5 is provided with a transverse groove 12 adjacent the edge thereof to thereby form an inwardly projecting detent 13 (Figure 3) which securely maintains the leg in the socket 8 by causing a clamping action to be exerted upon the leg when the same is forced into the socket. The detent 13 eliminates any need of other securing means for joining the bracket and leg and also reinforces the wall 5 of the bracket against distortion, which, for example, may be caused by a nail or the like projecting from the upper end of a leg. However, the wall 5 is provided with a notch 14 adjacent the upper edge thereof to accommodate any desired securing means for connecting the bracket and leg if added safety is desired. Any desired securing means may be so used or as shown in the drawing, a nail 15 may be employed, the shank of the nail entering only the upper portion of the leg (Figure 3), and the head of the nail overlapping and engaging the wall 5. In the event that for any reason the upper portion of the leg contracts the notch 14 when properly sized tends to eliminate wobbly side motion of the leg by its contact with the nail 15. By connecting the bracket and leg in this manner, the looseness resulting from contraction of the leg is automatically compensated for due to the fact that when contracted, the leg will be forced further into the socket 8 by the weight imposed upon the beam 4, this additional movement of the leg not being interfered with in any manner by the nail 15.

The operation of the present invention is quite simple. The brackets 3 are mounted in opposed relationship on each side of the beam 4 at the desired angles. The upper portions of the legs are next inserted into the brackets and preferably forced thereinto, the grooves 12 firmly clamping the legs in the sockets. If desired, securing means such as the nails 15 may be then utilized as hereinbefore described. To remove the legs from the sockets, it is simply necessary to first withdraw the nails 15 after the same have been used. The preferable method, is then to turn the complete structure upon its side and by pressing downwardly upon a leg 1 and pushing forwardly, the beam and respective bracket will be shoved away from the leg 2, the inner face 11 of the leg being sloping, greatly aids in the quick releasement of the legs. The leg 1 will be then easily removed by blocking the beam 4, pressing down upon the outer end of the leg and withdrawing the same from the socket 8. In other words, by merely pressing the outer ends of adjacent legs toward each other, the clamping action created by the detents 13, is released and the legs may be readily withdrawn.

In Figure 5 I have illustrated an alternative form of my invention wherein the plate or wall 5' of the bracket is identical to that in the preferred form of the invention with the exception that a slot 14' is formed in the wall 5' to take the place of the previously described notch 14 in the preferred form of the device. This slot 14' is disposed centrally of the wall 5' and is adapted to accommodate a nail 15' extending through the slot into the associated leg 1—2. This nail 15' performs substantially the same function as the nail 15. It permits of a relative movement between the leg and the bracket as long as the leg is moving in an upward direction but it prevents movement of the leg in a downward direction relative to the bracket.

From the foregoing, it is apparent that I have provided a bracket of the type described herein, mountable at any desired angle upon an object, and which securely and positively retains a portion of a leg, upright, or similar structure therein. Further, even though additional securing means are used, the construction of the bracket permits the automatic compensation for contraction of the member in the bracket. In addition, the present invention is readily and easily mounted or removed, is reinforced at the portion of most strain, is durable, and may be economically manufactured.

I am aware that many changes may be made and numerous details of construction may be varied through a wide range without departing from the principles of this invention and I, therefore, do not purpose

I claim as my invention:

1. In a device of the character described, a metallic member bent to form a socket, said member being provided with a transverse groove-like detent adjacent an edge of said socket and extending into said socket.

2. In a device of the character described, a metallic member bent to form a socket, wings projecting laterally therefrom for securing the device to a structure, a portion of said socket extending outwardly from said wings, said portion being provided with an inward detent disposed transversely thereof to aid in retaining an object in said socket.

3. In combination, a member, a supporting element, and a bracket secured to said member and bent to form a socket to receive a part of said element, a portion of said bracket extending outwardly from said member, said portion being transversely grooved to provide an inward detent engageable with said element.

4. As an article of manufacture, a bracket for removably connecting a pair of members, said bracket including a metallic plate bent to form a socket for receiving a portion of one of said members, laterally extending wings for securing said plate to the other of said members at any desired angle, the front wall of said socket extending outwardly from said other member and provided with a transverse groove adjacent its outer edge to form an inward detent to aid in retaining said portion of one of said members in said socket.

5. In combination, a member, a bracket bent to form a socket secured to said member, a second member having an end portion thereof insertable in said socket, a portion of said bracket extending outwardly beyond said first mentioned member and engaging said second member, said bracket portion having an inward detent disposed transversely thereof to provide a clamping action on the end portion of said second member when the same is forced into said socket.

6. As an article of manufacture, a bracket comprising a plate having an offset portion to accommodate an object to be supported, and an inwardly extending transverse rib associated with said portion for frictionally engaging the object, said rib serving to resist buckling of said plate and frictionally clamping said portion of the plate to said object.

7. As an article of manufacture, a bracket comprising a plate having an offset portion to accommodate an object to be supported, an inwardly extending transverse rib associated with said portion for frictionally engaging the object, said rib serving to resist buckling of said plate and frictionally clamping said portion of the plate to said object, and means connected to said portion in such a manner as to prevent relative movement between the plate and object in one direction but to permit such movement in an opposite direction.

8. As an article of manufacture a supporting bracket for legs, standards and the like. comprising a member bent to form a socket for receiving an end of said leg, laterally extending wings formed on said member for securing the bracket to a supporting structure. the front wall of said socket being spaced outwardly from the plane of said wings, a groove extending transversely of said wall adjacent its lower edge to form a ridge on the inner surface of said wall projecting into said socket so as to engage said leg and hold the same spaced away from the lower edge of said wall.

In testimony whereof I have hereunto subscribed my name at Chicago, Cook County, Illinois.

EDWARD B. BRITTIN.